United States Patent
Kubo et al.

(10) Patent No.: US 8,190,729 B2
(45) Date of Patent: May 29, 2012

(54) METHOD FOR CONTROLLING NETWORK COMPRISED OF ENORMOUS NODES, AND NODE AND CONTROL PROGRAM TO PERFORM SAID METHOD

(75) Inventors: Takeshi Kubo, Saitama (JP); Toru Hasegawa, Saitama (JP); Tatsuya Suda, Fukushima (JP)

(73) Assignees: KDDI Corporation, Tokyo (JP); Tatsuya Suda, Fukushima (JP)

( * ) Notice: Subject to any disclaimer, the term of this patent is extended or adjusted under 35 U.S.C. 154(b) by 416 days.

(21) Appl. No.: 12/539,178

(22) Filed: Aug. 11, 2009

(65) Prior Publication Data
US 2010/0036937 A1    Feb. 11, 2010

(30) Foreign Application Priority Data
Aug. 11, 2008    (JP) ................................ 2008-206697

(51) Int. Cl.
     *G06F 15/173*      (2006.01)
(52) U.S. Cl. .... 709/223; 709/222; 709/221; 340/539.26
(58) Field of Classification Search .......... 709/223–224; 340/539.22
See application file for complete search history.

(56) References Cited

U.S. PATENT DOCUMENTS

| | | | |
|---|---|---|---|
| 2007/0078540 A1* | 4/2007 | Bump et al. | 700/90 |
| 2007/0184850 A1* | 8/2007 | Hupp et al. | 455/456.1 |
| 2007/0230421 A1* | 10/2007 | Roadknight | 370/338 |
| 2008/0209026 A1* | 8/2008 | Qi et al. | 709/223 |
| 2009/0143019 A1* | 6/2009 | Shellhammer | 455/67.11 |
| 2010/0293131 A1* | 11/2010 | Qi et al. | 706/52 |

OTHER PUBLICATIONS

Intanagonwiwat et al, "Directed Diffusion for Wireless Sensor Networking," IEEE/ACM Transactions on Networking, 2003, pp. 1-15, vol. 11, No. 1.

Ye et al. "GRAdient Broadcast: A Robust Data Delivery Protocol for Large Scale Sensor Networks,"ACM Wireless Networks, 2005, pp. 285-298, vol. 11, No. 3.

Ratnasamy et al. "Data-Centric Storage in Sensornets with GHT, A Geographic Hash Table," ACM Mobile Networks and Applications, 2003, pp. 1-16, vol. 8, Issue 4.

* cited by examiner

*Primary Examiner* — Abdullahi Salad
(74) *Attorney, Agent, or Firm* — Oliff & Berridge, PLC

(57) ABSTRACT

A present invention provides a method for controlling roles of nodes in a network comprised of enormous nodes dynamically and distributed autonomously in such a way that the entire network can operate distributed autonomously. A method for controlling a field value $u_0$ of node in a network comprises: a step of determining an initial value of said field value $u_0$, and a step of updating said field value $u_0$, the step of updating comprising: advertising said field value $u_0$ to adjacent nodes, measuring an environment parameter $\omega$ from the environment of the node, receiving field values $u_n$ of the said adjacent nodes, recording the field values $u_n$, calculating a new field value $u_0$ from the field value $u_0$, the field values $u_n$ of the adjacent nodes and the environment parameter $\omega$ in such a way that field values of nodes whose environment parameter $\omega$ are within a constant range agree with given distribution, deleting the previous field value $u_0$, and recording said new field value $u_0$.

8 Claims, 3 Drawing Sheets

FIELD VALUE THAT NODE HAS
IS LARGE AS THE NODE IS CLOSER TO CENTER

NODES IN SIMILAR SITUATION

FIELD VALUE THAT NODE HAS
IS LARGE AS THE NODE IS CLOSER TO CENTER

CIRCLE SHOWS NODE,
INSIDE NUMBER SHOWS VALUE OF $\omega$.

NODE WHOSE RIM IS
THICK EMITS LIGHT.

METHOD FOR CONTROLLING NETWORK COMPRISED OF ENORMOUS NODES, AND NODE AND CONTROL PROGRAM TO PERFORM SAID METHOD

PRIORITY CLAIM

This application claims priority from Japanese patent application No. 2008-206697, filed on Aug. 11, 2008, which is incorporated herein by reference.

BACKGROUND OF THE INVENTION

1. Field of the Invention

The present invention relates to a method for controlling a network comprised of enormous nodes, and a node and a control program to perform said method. More specifically, the present invention relates to a method for controlling roles of the nodes in the network dynamically and distributed autonomously, and a node and a control program to perform said method, in a system to which service is provided by a large number of nodes operating.

2. Description of the Related Art

A sensor network is illustrated as an example of a system to which service is provided by a large number of devices operating. In the sensor network, the sensor device which measures environment not only is used for a single device, but also is used for applications to capture environment information of a wide area with dispersively locating a large number of devices in the environment. On this occasion, since a large number of the devices do not necessarily operate all at the same time, the control structure that only the sufficient number of the devices covering a measurement area operate and the structure to transfer information to an appropriate node in order to collect the information measured by such devices to a data processing server and so on are necessary.

In fact, in this field, the structure to control a large number of devices is actively studied. However, not only the case of comprising of low function and small size devices such as the sensor devices, but also the case of comprising of high-performance devices such as PCs in a P2P network may be considered.

In a conventional computer network, it is previously decided how each node should play a role. Under such limited condition, as the system can suitably operate, various control techniques are devised and implemented. For example, in the case of the sensor network, there is a node called a sink node in a large number of sensor devices (below, it is called a node merely). The Sink node has a gateway role to collect information from the nodes in the network and to hand it to a server in another network (e.g. Internet). When a large number of nodes are sprinkled in the environment, it is necessary to send the information which these nodes maintain to the Sink node efficiently, and then various techniques are devised (For example, "Directed Diffusion for Wireless Sensor Networking," C. Intanagonwiwat, R. Govindan, D. Estrin, J. Heidemann, and F. Silva, IEEE/ACM Transactions on Networking, VOL. 11, NO. 1, pp 2, 2003 and "GRAdient Broadcast: A Robust Data Delivery Protocol for Large Scale Sensor Networks," F. Ye, G. Zhong, S. Luand L. Zhang, ACM Wireless Networks, Volume 11, Number 3, pp. 285-298(14), 2005).

Also, as the slightly different technique from this, S. Ratnasamy et al ("Data-Centric Storage in Sensornets with GHT, A Geographic Hash Table," S. Ratnasamy, B. Karp, S. Shenker, D. Estrin, R. Govindan, L. Yin and F. Yu, ACM Mobile Networks and Applications, Volume 8, Issue 4, pp. 1-16, 2003) changes a maintaining information with depending on a geographical area. They consider a global area that a large number of nodes are sprinkled. When the information obtained at the node of some place is the information of the classification called "A", the node sends the information to a local area "a" (a plot in the global area). The mapping rule of "a" and "A" is previously determined and the sensor node knows it. Since there are a large number of nodes in the local area "a", one of them maintains the information. Next, they consider taking the information from the network. Here, if the information "A" is required, a requester, who may be outside the network, transmits a request packet to this sensor network. The sensor nodes converts "A" into the local area "a", and then transfers the request packet to the local area "a". And, the node maintaining an appropriate information replies to the request and returns necessary information.

BRIEF SUMMARY OF THE INVENTION

It is common for two said examples that the role for network control is predetermined. In other words, in the former, it is determined who becomes the Sink node, in the latter, it is determined which type of information is managed in which area. However, in the latter case, the node itself does not have the role, the geographical place (an absolute place) has the role.

However, in the case where the role has been determined previously, when some troubles, e.g. a large number of nodes result in failure or move suddenly, or the connection of the communication was cut off, happen in the system, it becomes difficult to maintain the operation of the system. For example, when the Sink node results in failure, it is necessary to perform a procedure making another node play the role of the Sink node by some kind of methods. However, when the number of nodes comprising the system becomes enormous, there is a problem that it becomes very difficult to exchange information and to control the operation with identifying a partner.

Therefore, it is an object of a present invention to provide a method for controlling roles of nodes in a network dynamically and distributed autonomously in such a way that the entire network can operate distributed autonomously, and a node and a control program to perform said method, in the network comprised of enormous nodes.

To realize the above object, according to the present invention, a method for controlling a field value $u_0$ of a node in a network comprises: a step of determining an initial value of said field value $u_0$, and a step of updating said field value $u_0$, the step of updating comprising: advertising said field value $u_0$ to adjacent nodes, measuring an environment parameter $\omega$ from the environment of the node, receiving field values $u_n$ of said adjacent nodes, recording the field values $u_n$, calculating a new field value $u_0$ from the field value $u_0$, the field values $u_n$ of the adjacent nodes and the environment parameter $\omega$ in such a way that field values of nodes whose environment parameter $\omega$ are within a constant range agree with given distribution, deleting the previous field value $u_0$, and recording said new field value $u_0$.

Further, it is also preferable that said distribution gives a value to the nodes whose parameter $\omega$ is within the constant range such that the value is larger as the node is closer to a center of the range.

Further, it is also preferable that the calculation of the new field value $u_0$ comprises: solving a differential equation which a, b, c, x are constant $$\frac{du(t)}{dt} = v(t) + a\sum(u_n - u(t))$$

$$\frac{dv(t)}{dt} = -\omega \cdot u(t) - b \cdot v(t) + accel,$$

$$\begin{pmatrix} accel = c & \text{if} & -x < u(t) < x & \text{and} & v(t) > 0 \\ accel = -c & \text{if} & -x < u(t) < x & \text{and} & v(t) < 0 \\ accel = 0 & \text{if} & -x \geq u(t) & \text{or} & u(t) > x \end{pmatrix}$$

with initial condition $u(0)=u_0$ and $v(0)=0$, obtaining the solution $u(t)$, and setting the new field value $u_0$ as a value of $u(t)$ after a constant time.

Further, it is also preferable that the initial value of said field value $u_0$ is determined at random from within a constant range.

To realize above object, according to the present invention, a node in a network comprising a field value control means for controlling a field value $u_0$ of the node and an environment input means for measuring an environment parameter $\omega$ comprises: a means for determining an initial value of said field value $u_0$ by said field value control means, and a means for updating said field value $u_0$, the means for updating comprising: advertising said field value $u_0$ to adjacent nodes by said field value control means, measuring the environment parameter $\omega$ from the environment of the node by said environment input means, receiving field values $u_n$ of the said adjacent nodes by said field value control means, recording the field values $u_n$ by said field value control means, calculating a new field value $u_0$ from the field value $u_0$, the field values $u_n$ of the adjacent nodes and the environment parameter $\omega$ in such a way that field values of nodes whose environment parameter $\omega$ are within a constant range agree with given distribution by said field value control means, deleting the previous field value $u_0$ by said field value control means, and recording said new field value $u_0$ by said field value control means.

Further, it is also preferable that said node further comprises an operation list describing conditions and operations when said conditions are satisfied, and an operation control means for controlling said operations, and said conditions are based on said field value $u_0$.

Further, it is also preferable that said node further comprises an operation list describing conditions and operations when said conditions are satisfied, and an operation control means for controlling said operations, and said conditions are based on said field value $u_0$ and said field values of the adjacent nodes.

To realize above object, according to the present invention, a program controlling a field value $u_0$ of a computer in a network comprises: a means for determining an initial value of said field value $u_0$, and a means for updating said field value $u_0$, the means for updating comprising: advertising said field value $u_0$ to adjacent nodes, measuring an environment parameter $\omega$ from the environment of the node, receiving field values $u_n$ of the said adjacent nodes, recording the field values $u_n$, calculating a new field value $u_0$ from the field value $u_0$, the field values $u_n$ of the adjacent nodes and the environment parameter $\omega$ in such a way that field values of nodes whose environment parameter $\omega$ are within a constant range agree with given distribution, deleting the previous field value $u_0$, and recording said new field value $u_0$.

According to the present invention, nodes in the similar situation can be grouped distributed autonomously by each node in the network communicating with only adjacent nodes. In this case, an identifier such as the IP address is not necessary for each node, a central server grasping the situation of the entire system is not necessary for the network.

Since the nodes are grouped distributed autonomously, when some kind of troubles are happened, the groups change dynamically following the trouble of the node and an environment change. In other words, the nodes comprising the groups change dynamically.

Also, it is possible for each group made in this way to carry out one (a series of) service.

DETAILED DESCRIPTION OF THE INVENTION

In this embodiment, nodes in similar situation construct groups autonomously, and each group provides one service. In order to provide one service, the groups contain a plurality of roles. Thus, the nodes existing in the network construct groups autonomously, and determine roles accomplished in groups autonomously. Thereby, in the network comprised of enormous nodes, the entire network can operate distributed autonomously.

Specifically, in this embodiment, in the groups constructed autonomously, each node can know whether it is located in a vicinity of a center of the group or it exists toward an edge, using it, each node decides an operation depending on its position. However, each node does not have a means for measuring its position such as a GPS, also, since each node does not have an identifier such as an IP address, it cannot communicate by specifying a partner.

The embodiment of the present invention will be described below with reference to the drawings. In this embodiment, a sensor network is described as an example of a network comprised of a large number of nodes. The node may be relatively a low function in small size such as a sensor device, or the high-performance such as a PC of a P2P network.

Figure 1:
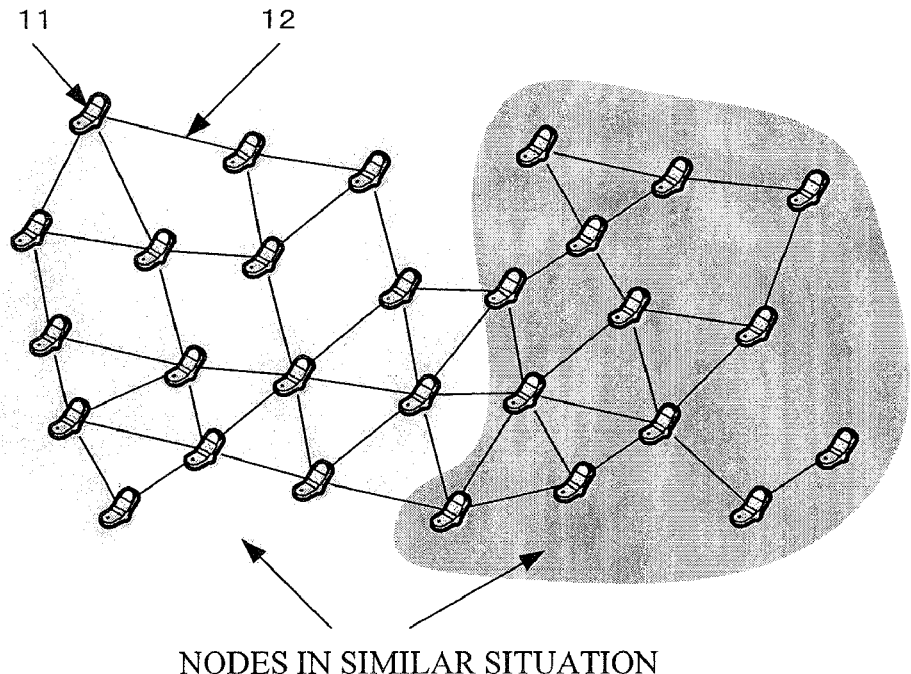
FIG. 1 shows a network in the present embodiment.

FIG. 1 shows a network in the present embodiment. This network is comprised of a large number of nodes 11, and the nodes existed in some area are in the similar situation. Here, "the situation" shows, for example, temperature or humidity measured by each node 11, a battery residual quantity of each node 11, an amount of information which each node 11 maintains, a classification of information which each node 11 maintains, etc. Therefore, the nodes in "the similar situation" show the nodes maintaining information such as similar temperature, humidity, etc (there are two kinds of situations in FIG. 1). In this embodiment, there is an adjacency relationship between nodes 11 in the network. The adjacency relationship shows that each node can communicate directly. In the case of sensor networks, the nodes often communicate by radio. In this case, since the node 11 can communicate directly to nodes in the area which the radio reaches, the node 11 in the network has the adjacency relationship with the nodes 11 in this area. Also, in the case of the cable network such as the P2P network, the adjacency relationship is replaced with a logical connection relationship. In other words, when the nodes 11 recognize each other as the communication partner and communicate directly, the nodes have the adjacency relationship. In FIG. 1, there is the adjacency relationship between the nodes that a communication link 12 is set.

Moreover, these nodes 11 do not have to have the identifier such as the IP address, and the position measuring means such as the GPS.

In this embodiment, each node 11 in the network maintains "a field value" that is a parameter to determine its own operation.

Figure 2:
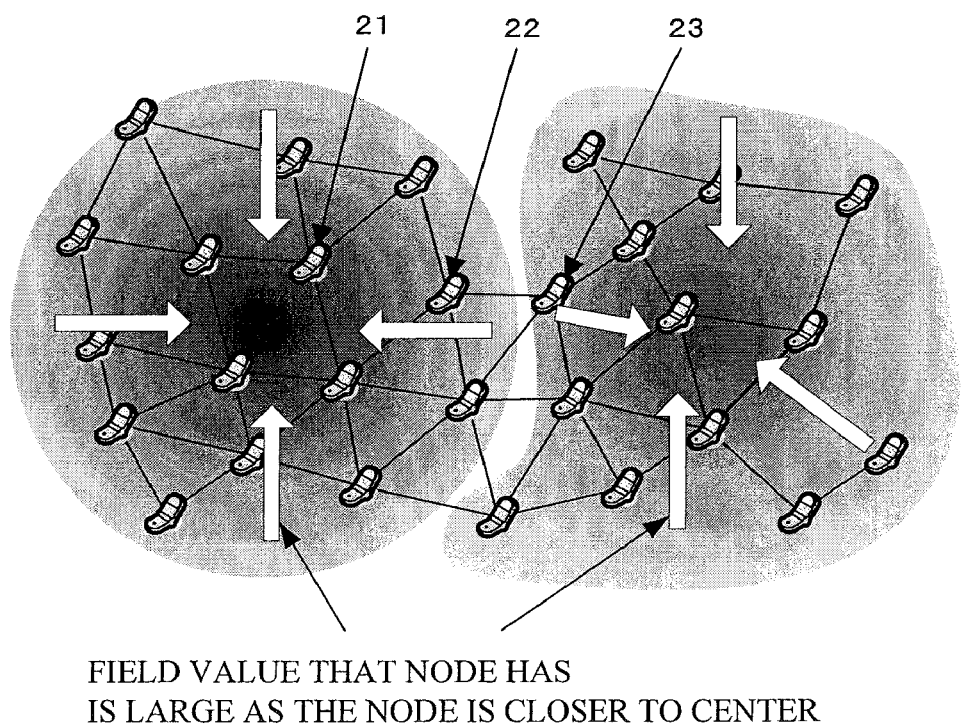
FIG. 2 shows an example of a distribution of the field value generated in the present embodiment.

FIG. 2 shows an example of a distribution of the field value generated in the present embodiment. This distribution is generated by an algorithm that each node changes its own field value by referring the field values of nodes having the adjacency relationship, and the algorithm will be explained later. Each node can communicate with only the adjacent nodes directly as described before, but when looking as the entire system, the nodes in the similar situation are grouped and the distribution of the field value is generated in each group. The distribution of FIG. 2 is the distribution that the filed value is larger as the nodes are closer to a center of the group. Here, the center of the group is the position of the node that the distance from the node which does not belong to the group is the largest. Note that, the central node of the group may not be one. Also, the distance is a logical distance based on the communication links between the nodes as well as a physical distance between the nodes. In FIG. 2, when a node 22 is compared with a node 21 which belongs to the group of the left side, as for the distance from a node 23 which does not belong to the group of the left side, the node 21 is larger than the node 22 and is closer to central. Thus, the field value of the node 21 becomes larger than the field value of the node 22.

Generally, "the situation (e.g. temperature)" changes. Also, a node may result in failure, and it may move. Therefore, "the vicinity of the center of the nodes in the same situation" cannot be decided with unique. However, according to the present embodiment, by each node changing the field value dynamically, it is always possible to form the distribution of the field value of each group as shown in FIG. 2.

Figure 3:
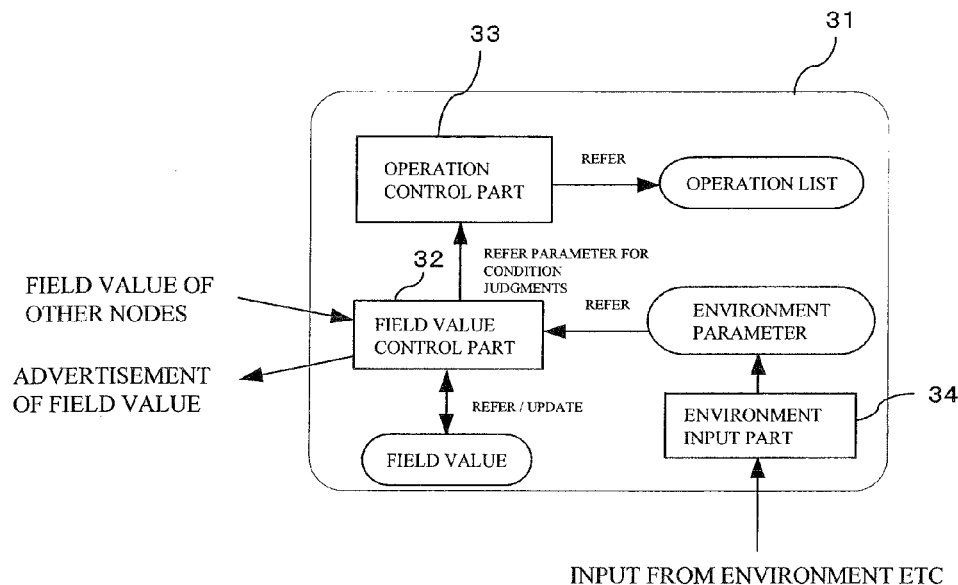
FIG. 3 shows a basic structure of the node of the present embodiment.

FIG. 3 shows a basic structure of the node of the present embodiment. A node 31 is comprised of a field value control part 32, an operation control part 33 and an environment input part 34, and the node 31 maintains the field value, an environment parameter and an operation list inside.

The field value control part 32 updates the field value from its own field value, the field value of the adjacent nodes (the nodes having the adjacency relationship), and the environment parameter, receives the field value of the adjacent nodes, advertises its own field value to the adjacent nodes. The operation control part 33 performs operations described in the operation list. The operation list describes a plurality of conditions about the field value etc, and the operations that the node should take when the conditions are satisfied. The environment input part 34 inputs information from the outside or inside environment of the nodes, digitizes this information. The details of each means will be described below, respectively.

[The Field Value Control Part, the Field Value, the Environment Parameter]

A procedure that the field value control part of node 31 determines its own field value from the environment parameter etc. will be shown below.

(1) The field value control part 32 receives the field value which the adjacent nodes advertise during the field value collection period (it is referred to $I_c$), and records (in other words during time T–T+$I_c$). However, herein, it is not necessary to distinguish who sends the advertisement, and merely the value is only recorded.

(2) After the end of the collection period (in other words at time T+$I_c$), the field value control part 32 obtains "its own field value" and the value of "the environment parameter".

(3) The field value control part 32 advertises "its own field value" to circumference at the time T+$I_a$ ($I_a$ is an advertisement interval). Note that, it is assumed that $I_a$=N*$I_c$, and the field value control part 32 advertises once every N times of the field value collection period.

(4) The field value control part 32 calculates its own field value after the interval $I_c$ using the following formula from information obtained with (2) at time T+$I_c$.

$$\frac{du(t)}{dt} = v(t) + a \sum (u_n - u(t))$$

$$\frac{dv(t)}{dt} = -\omega \cdot u(t) - b \cdot v(t) + accel,$$

$$\begin{pmatrix} accel = c & \text{if} & -x < u(t) < x & \text{and} & v(t) > 0 \\ accel = -c & \text{if} & -x < u(t) < x & \text{and} & v(t) < 0 \\ accel = 0 & \text{if} & -x \geq u(t) & \text{or} & u(t) > x \end{pmatrix}$$

with initial condition u(0)=$u_0$ and v(0)=0.

Here, the t is the time, the u(t) is the function of the field value, the $u_n$ is the field value advertised by the adjacent nodes and recorded in the procedure (1), the ω is the value of the environment parameter obtained in the procedure (2), a, b, c, x are constant (the accel varies with values of u and v). Also, since the v is a by-product which appears when the field value u is calculated, there is not any kind of input, particularly. Note that, the Σ of the formula of du(t)/dt shows that all differences between the maintained field value of adjacent nodes and its own field value are added up. The part of Σ assumes 0 if the field value is received from no adjacent node during the period.

(5) The field value control part 32 deletes the recorded field value of the adjacent nodes and the its own field value, and makes new its own field value a value u(t=T+2$I_c$) at t=T+2$I_c$ of obtained function u(t).

(6) The field value control part 32 returns the procedure (1) and repeats process.

Note that, the initial value of the field value of each node may be a random value from within a suitable range (e.g., during –1 and 1). The environment input part 34 collects some kind of situation that the nodes are put, the environment parameter ω is obtained by digitizing it. When the node is a temperature sensor, the simplest example just assumes a value of measured temperature the ω. In addition, the amount of information that the node maintains, a band width that the node can use, the free buffer size in the node, the battery residual quantity of the node, etc. are considered.

Figure 4:
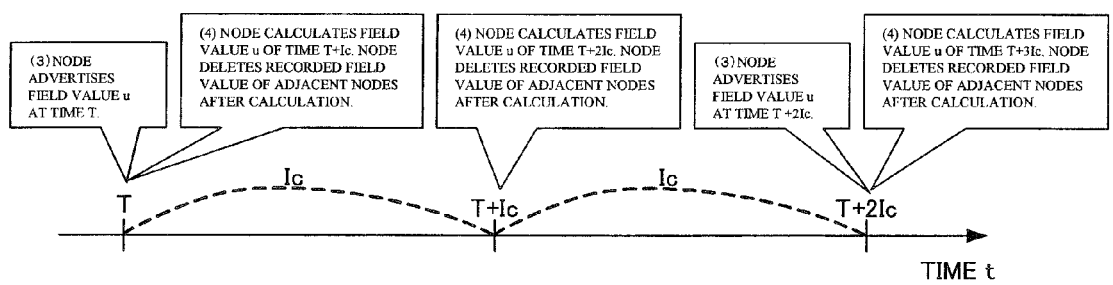
FIG. 4 shows a flow of the process of the field value control part in the case of N=2.

FIG. 4 shows a flow of the process of the field value control part in the case of N=2.

As shown in FIG. 4, in some time T, the field value control part advertises the field value $u_0$ of that time to the adjacent nodes. Furthermore, the field value $u_T(T+I_c)$ at the time T+$I_c$ is calculated by solving the above-mentioned differential equation with the field value $u_0$ of that time, the environment parameter ω, and the field value $u_n$ of the adjacent nodes (Here, a subscript T means that solution u(t) is obtained at the time T). At the next time $T+I_c$, the differential equation is solved again similarly, the solution $u_{T+Ic}(t)$ is obtained, and then the field value $u_{T+Ic}(T+2I_c)$ at the time $T+2I_c$ is calculated. At the next time $T+2I_c$, the field value $u_{T+Ic}(T+2I_c)$ is advertised to the adjacent nodes. Also, in similar fashion, the field value $u_{T+2Ic}(T+3I_c)$ at the time $T+3I_c$ is calculated. The same operation is repeated after.

Note that, the numerical computation technique such as the Runge-Kutta method or the Euler method may be used to solve this differential equation. Ideally, it is preferable that the value of $I_c$ is extremely almost 0, in other words, it is preferable that the node receives at most one advertisement during $I_c$. However, since shortening the $I_c$ leads to a rise of the calculation load, it is difficult to make the $I_c$ a small value without reason. Therefore, a moderate value, e.g. about 10 milliseconds-100 milliseconds is appropriate. This value depends on the number of the nodes having the adjacency relationship and the possible value $\omega$. Only as a guide, when the maximum of possible $\omega$ in a network is assumed $\omega_m$, it is thought that the $I_c$ is suitable either small around some parts of "$1/\sqrt{(\omega_m)}$" seconds or around some parts of "$I_a/$(the number of the maximum adjacent nodes)" seconds. Also, the value N of the procedure (3) had better be small, too (ideally N=1). However, since the amount of advertised packet increases if N is decreased, it is necessary to adjust the N depending on the value $I_c$ moderately. For example, it assumes $I_a$=0.1-1 seconds.

When the above procedure is performed, if the environment parameter $\omega$ does not change, the field value oscillates (approximately a simple oscillation) within some range. This oscillation frequency becomes almost the square root of $\omega$. On this occasion, the amplitude of the oscillation is larger as the node is closer to the center of the group having the similar environment parameter, and is smaller as the node is closer to the edge.

Figure 5:
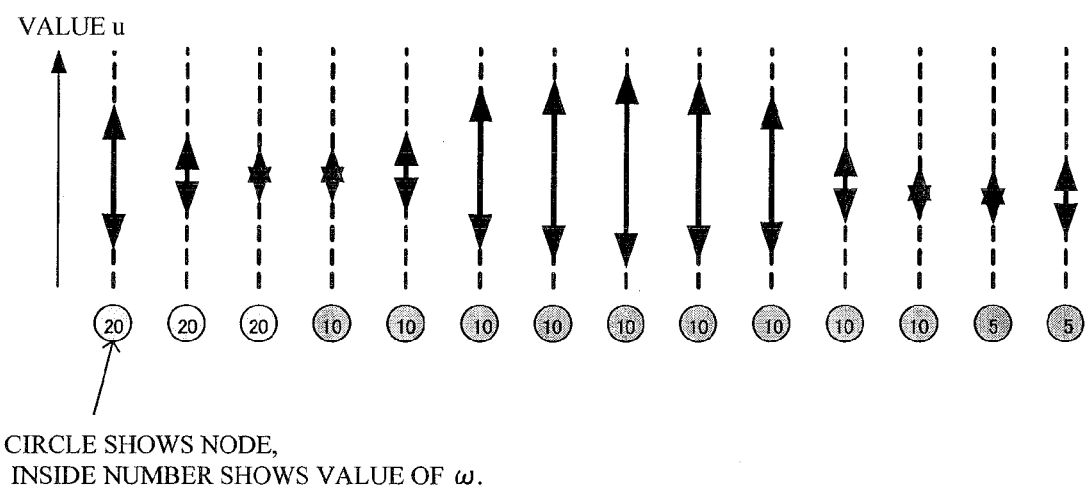
FIG. 5 shows a state of the amplitude of the field value u when the nodes are placed in the one dimension.

FIG. 5 shows a state of the amplitude of the field value u when the nodes are placed in the one dimension. As shown in FIG. 5, the nodes having the same value $\omega$ form one group, and a distribution is generated, which the amplitude of the oscillation is larger as the node is closer to the center and is smaller as the node is closer to the edge. Also, most of the oscillation in each group synchronizes. Note that, whether the value $\omega$ of each node is within "the similar environment parameter" depends on the values a and x of the above formula, the range of $\omega$ within "the similar environment parameter" is smaller as the a becomes larger and the x becomes smaller. Note that, since FIG. 5 takes out the part of the range that the value $\omega$ is 10, there are nodes that the value $\omega$ is 20 not shown in the left side of the figure, and there are nodes that the value $\omega$ is 5 not shown in the right side of the figure.

When the connection relationship with the adjacent nodes changes very much or the environment parameter changes, the oscillation of the field value is disturbed temporarily. However, when time passes a little, it becomes the simple oscillation (the time to converge to the simple oscillation depends on the a of the above formula. the convergence becomes faster as the a is larger). For example, when the measured temperature is used as the environment parameter, if the temperature distribution of the environment changes, according to it, the oscillation of the field value u of each node changes, and the distribution of the oscillation is rebuilt in a new area, which the amplitude is larger as the node is closer to the center of the new area and is smaller as the node is closer to the edge.

[The Operation Control Part, the Operation List]

Below, it will be shown that the operation control part 33 of the node 31 determines the operation of the node 31 based on the operation list.

Each node in the network has the operation list to determine its own operation. In each entry of the operation lists "condition" and "operation" are described, the operation control part 33 of the node performs the operation of the entry which the condition matches. And, this condition associates with the field value. Note that, the condition in the operation list can consider not only the field value but also another parameter. The specific example of the operation list will be shown below.

[The Operation List]

The condition: the node itself maintains information, and there is an adjacent node which has a larger field value than that of own.

The operation: the node transfers the information to the node which has the larger field value.

The condition: the node itself maintains information, but there is not an adjacent node which has a larger field value than that of own.

The operation: Nothing is done with maintaining information. (The node does not transfer).

The condition: the node does not maintain information.

The operation: Nothing is done.

In the case of this operation list, in the example of FIG. 2, the information is collected in the vicinity of the center of each group. A series of service that the information is collected in the center of the group every group is carried out.

The above "conditions" can be classified roughly into two kinds. The one is the condition to its own field value (or the information associated with it). The other is the condition to relationship between the field value of the adjacent nodes and its own field value (e.g. the difference between its own field value and the field value of the adjacent nodes is plus or minus). In the former, the information associated with the field value is the value such as the maximum value of the amplitude not the instantaneous value of the field value. In the latter case, it is necessary to obtain the field value of the adjacent nodes. Of course, in the latter case, the field value may be the information associated with the field value not the instantaneous value of the field value. In any case, the operation control part 33 obtains the information (the value) that is necessary for the condition judgment of the operation list from the field value control part 32. In this embodiment, the examples of the former and the latter will be shown, respectively.

First, the example of the condition to its own field value will be shown.

The node has following abilities and many nodes are sprinkled the environment.

The node can measure temperature (a temperature sensor)

The node can emit light (a light emitting device)

The above device node makes the field value u vary by above mentioned procedure. At this time, as the environment parameter $\omega$, a value of measured temperature is used. The operation list describes entries having the condition about the maximum amplitude value of the value u. Note that, the maximum amplitude value A of the value u of the each node is obtained by $A=\sqrt{(u^2+v^2/\omega)}$, easily (the field value control part 32 sends this value A to the operation control part 33). Thus, the condition of the operation list includes the v which is the by-product of the calculation process and the environment parameter $\omega$ of the node (even this case the condition is the information associated with the value u). The specific operation list will be as follows.

[The Operation List]

The condition: the node measures temperature, and its own maximum amplitude value A is equal to or smaller than threshold Th.

The operation: the node emits light.

The condition: the node does not measure temperature, or its own maximum amplitude value A is larger than threshold Th.

The operation: the node does not emit light.

Figure 6:
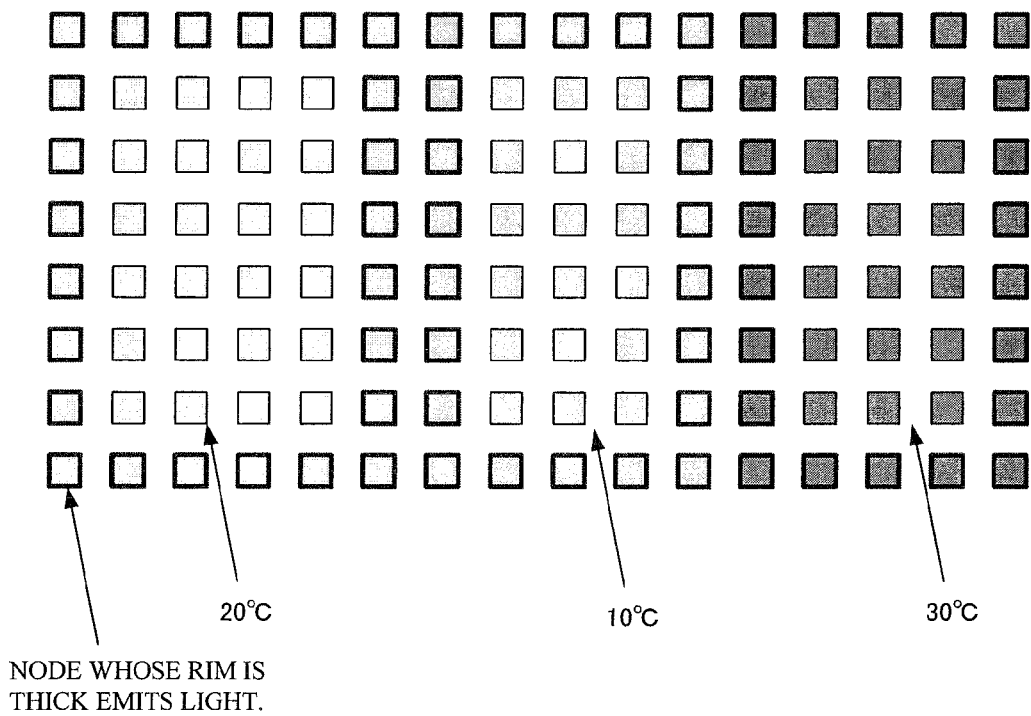
FIG. 6 shows an example of operation of the node in the case of the condition to its own field value.

FIG. 6 shows an example of operation of the node in the case of the condition to its own field value. In these nodes, three groups of 20° C., 10° C. and 30° C. are made. By using the above operation list for these nodes, only the nodes near the border area which is the same (or similar) temperature emit light. In other words, without collecting any data, it is possible to view the temperature border in the field. Note that, the threshold Th is the suitable constant number.

Next, the example of the condition to the relationship between the field value of the adjacent nodes and its own field value will be shown.

The node is the temperature sensor, and can know its own battery residual quantity. As the environment parameter $\omega$, the value of the battery residual quantity of the node is used. The operation list describes entries having the condition about the maximum amplitude value of the value u and entries having the condition about the difference between the value $u_n$ of the adjacent node and its own value u. The maximum amplitude can be obtained by the above formula similarly. Since the node records the value $u_n$ of the adjacent nodes when the advertisement is received in the above mentioned procedure (1), the difference between the value $u_n$ of the adjacent nodes and its own value u can be obtained. The specific operation will be as follows. Note that, here, it is assumed $D_n=u_n-u$ (n takes from 0 to a number of received advertisements −1, and $D_n$ is considered as the difference between a value $u_n$ of each advertised adjacent node and its own value u).

[The Operation List]

The condition 1: the node itself maintains information (the temperature data), and there is at least one n such that [u>0 and $D_n$>0] or [u<=0 and $D_n$<0] when the node receives the advertisements of the field value from other nodes during the field value collection period $I_c$.

The operation: the node broadcasts a maintaining information packet. At this time, its own value A (the maximum amplitude value) is added as information of a source host.

The condition 2: the node itself maintains information, and there is not one n such that [u>0 and $D_n$>0] or [u<=0 and $D_n$<0] when the node receives the advertisements of the field value from other nodes during the field value collection period $I_c$ (in other words, its own value u is the largest in the vicinity).

The operation: Nothing is done with maintaining information (The node does not transfer).

The condition 3: the node itself maintains information, but the node does not receive the advertisements of the field value from other nodes during the field value collection period $I_c$.

The operation: Nothing is done with maintaining information (The node does not transfer).

The condition 4: the node receives the information packet, and the relationship between the maximum amplitude value $A_n$ of the source information and its maximum amplitude value A is $A_n$<A.

The operation: the node maintains the information in the received packet.

The condition 5: the node receives the information packet, and the relationship between the maximum amplitude value $A_n$ of the source information and its maximum amplitude value A is $A_n$>=A.

The operation: the node discards the received packet.

If each node operates based on this operation list, the operation of the entire system will be as follows.

When the node measures the temperature information, the node takes the difference between its own value u and value $u_n$ of the adjacent node, then examines which of conditions 1-3 is applied to, performs the applicable operation. If some node satisfies the condition 1, the temperature information is broadcasted. The node that received this packet examines whether the condition 4 or 5 is applied to, if the condition 4 is applied to, the node receives the packet and maintains it. The node that received the temperature information examines about conditions 1-3, because it is in condition "maintaining information". If this node applies to condition 1, it broadcasts all maintaining information (or some information if it cannot send at one time). Note that, at this time, the node transmits not only the information received from other nodes but also the information measured by itself.

By such operation, the nodes being similar battery residual quantity make groups, and the temperature data gather autonomously in the vicinity of the center of the group (because the information is transferred to the vicinity of the center of the group by conditions 1 and 4).

Note that, since the information is broadcasted, a plurality of nodes may receive the same data and then the finally gathered data may include a lot of repetition. In this case, with attaching the suitable ID for each data, the node that received the data of the same ID on transfer can delete others by leaving only one. Also, the node can delete the maintaining data as soon as the node transfers the data, but the node can improve certainty of the data transfer by maintaining it for a certain period (because the same data is broadcasted many times).

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A method for controlling a field value $u_0$ of a node in a network comprising:
   a step of determining an initial value of said field value $u_0$, and
   a step of updating said field value $u_0$, the step of updating comprising:
   advertising said field value $u_0$ to adjacent nodes,
   measuring an environment parameter $\omega$ from the environment of the node,
   receiving field values $u_n$ of said adjacent nodes,
   recording the field values $u_n$,
   calculating a new field value $u_0$ from the field value $u_0$, the field values $u_n$ of the adjacent nodes and the environment parameter $\omega$ in such a way that field values of nodes whose environment parameter $\omega$ are within a constant range agree with given distribution,
   deleting the previous field value $u_0$, and
   recording said new field value $u_0$.

2. The method for controlling the field value $u_0$ of the node according to claim 1, where in said distribution gives a value to the nodes whose parameter ω is within the constant range such that the value is larger as the node is closer to a center of the range.

3. The method for controlling the field value $u_0$ of the node according to claim 2, where in the calculation of the new field value $u_0$ comprises: solving a differential equation which a, b, c, x are constant $$\frac{du(t)}{dt} = v(t) + a\sum(u_n - u(t))$$

$$\frac{dv(t)}{dt} = -\omega \cdot u(t) - b \cdot v(t) + accel,$$

$$\begin{cases} accel = c & \text{if} \quad -x < u(t) < x \quad \text{and} \quad v(t) > 0 \\ accel = -c & \text{if} \quad -x < u(t) < x \quad \text{and} \quad v(t) < 0 \\ accel = 0 & \text{if} \quad -x \geq u(t) \quad \text{or} \quad u(t) > x \end{cases}$$

with initial condition $u(0)=u_0$ and $v(0)=0$, obtaining the solution $u(t)$, and setting the new field value $u_0$ as a value of $u(t)$ after a constant time.

4. The method for controlling the field value $u_0$ of the node according to claim 1, where in the initial value of said field value $u_0$ is determined at random from within a constant range.

5. A node in a network comprising a field value control means for controlling a field value $u_0$ of the node and an environment input means for measuring an environment parameter ω comprising:
   a means for determining an initial value of said field value $u_0$ by said field value control means, and
   a means for updating said field value $u_0$, the means for updating comprising:
   advertising said field value $u_0$ to adjacent nodes by said field value control means,
   measuring the environment parameter ω from the environment of the node by said environment input means,
   receiving field values $u_n$ of the said adjacent nodes by said field value control means,
   recording the field values $u_n$ by said field value control means,
   calculating a new field value $u_0$ from the field value $u_0$, the field values $u_n$ of the adjacent nodes and the environment parameter ω in such a way that field values of nodes whose environment parameter ω are within a constant range agree with given distribution by said field value control means,
   deleting the previous field value $u_0$ by said field value control means, and
   recording said new field value $u_0$ by said field value control means.

6. The node according to claim 5, where in said node further comprises an operation list describing conditions and operations when said conditions are satisfied, and an operation control means for controlling said operations, and said conditions are based on said field value $u_0$.

7. The node according to claim 5, where in said node further comprises an operation list describing conditions and operations when said conditions are satisfied, and an operation control means for controlling said operations, and said conditions are based on said field value $u_0$ and said field values of the adjacent nodes.

8. A non-transitory computer readable storage medium including a computer program for controlling a field value $u_0$ of a computer in a network comprising:
   a means for determining an initial value of said field value $u_0$, and
   a means for updating said field value $u_0$, the means for updating comprising:
   advertising said field value $u_0$ to adjacent nodes,
   measuring an environment parameter ω from the environment of the node,
   receiving field values $u_n$ of the said adjacent nodes,
   recording the field values $u_n$,
   calculating a new field value $u_0$ from the field value $u_0$, the field values $u_n$ of the adjacent nodes and the environment parameter ω in such a way that field values of nodes whose environment parameter ω are within a constant range agree with given distribution,
   deleting the previous field value $u_0$, and
   recording said new field value $u_0$.

* * * * *